US012594934B2

(12) United States Patent
Yu et al.

(10) Patent No.: US 12,594,934 B2
(45) Date of Patent: Apr. 7, 2026

(54) EQUIDISTANT-TEMPORAL AGGREGATION FOR MOVING OBJECT SEGMENTATION

(71) Applicant: QUALCOMM Incorporated, San Diego, CA (US)

(72) Inventors: Ming-Yuan Yu, Ann Arbor, MI (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 18/340,361

(22) Filed: Jun. 23, 2023

(65) Prior Publication Data

US 2024/0425042 A1     Dec. 26, 2024

(51) Int. Cl.
| | |
|---|---|
| *B60W 30/095* | (2012.01) |
| *G06T 7/10* | (2017.01) |
| *G06T 7/246* | (2017.01) |
| *G08G 1/16* | (2006.01) |

(52) U.S. Cl.
CPC ........... *B60W 30/0956* (2013.01); *G06T 7/10* (2017.01); *G06T 7/246* (2017.01); *G08G 1/16* (2013.01); *B60W 2420/403* (2013.01); *B60W 2420/408* (2024.01); *G06T 2207/10028* (2013.01); *G06T 2207/20221* (2013.01); *G06T 2207/30241* (2013.01); *G06T 2207/30252* (2013.01)

(58) Field of Classification Search
CPC ........ B60W 30/0956; B60W 2420/403; G06T 7/10; G06T 2207/30241; G06T 7/246
See application file for complete search history.

(56) References Cited

U.S. PATENT DOCUMENTS

| | | | |
|---|---|---|---|
| 10,169,680 B1 * | 1/2019 | Sachdeva | ............. G06F 3/04842 |
| 2007/0255498 A1 * | 11/2007 | McDaniel | ............. G01S 13/931 |
| | | | 340/436 |
| 2023/0122119 A1 * | 4/2023 | Wu | ...................... G05D 1/0289 |
| | | | 701/301 |
| 2024/0169563 A1 * | 5/2024 | Wen | .......................... G06T 7/11 |

OTHER PUBLICATIONS

International Search Report and Written Opinion—PCT/US2024/033577—ISA/EPO—Oct. 9, 2024 11 Pages.
Oron E., "Motion Estimation and Image Difference for Multi-object Tracking," 1999 IEEE Aerospace Conference. Proceedings, Snowmass at Aspen, CO, USA, Mar. 6-13, 1999, Piscataway, NJ, USA, IEEE, US, vol. 4, Mar. 6, 1999, pp. 401-409, XP010350294, ISBN: 978-0-7803-5425-8, the whole document.
Wang L., et al., "Multiple Contextual Cues Integrated Trajectory Prediction for Autonomous Driving," IEEE Robotics and Automation Letters, IEEE, vol. 6, No. 4, Oct. 2021, pp. 6844-6851, Jul. 7, 2021, XP011869380, DOI: 10.1109/LRA.2021.3094564 [retrieved on Jul. 22, 2021] Sections 1-4.

* cited by examiner

*Primary Examiner* — Toya Pettiegrew
(74) *Attorney, Agent, or Firm* — Shumaker & Sieffert, P.A.

(57) ABSTRACT

A system for navigation store, in a time-based buffer, a first set of frames acquired by a sensor; stores, in a distance-based buffer, a second set of frames acquired by the sensor; performs moving object segmentation on the first set of frames and the second set of frames to identify at least one moving object in a scene of the frames; predicts a trajectory of the at least one moving object; and performs a navigation function based on the predicted trajectory.

30 Claims, 4 Drawing Sheets

EQUIDISTANT-TEMPORAL AGGREGATION FOR MOVING OBJECT SEGMENTATION

TECHNICAL FIELD

This disclosure relates to moving object segmentation systems, including moving object segmentation used for advanced driver-assistance systems (ADAS).

BACKGROUND

An autonomous driving vehicle is a vehicle that is configured to sense the environment around the vehicle, such as the existence and location of other objects, and operating without human control. An autonomous driving vehicle may include a LiDAR (Light Detection and Ranging) system or other sensor system for sensing point cloud data indictive of the existence and location of other objects around the autonomous driving vehicle. In some examples, such an autonomous driving vehicle may be referred to as an ego vehicle. A vehicle having an ADAS is a vehicle that includes systems which may assist a driver in operating the vehicle, such as parking or driving the vehicle.

SUMMARY

To implement the navigation functionality, an ADAS may be configured to perform moving object segmentation using frames in a time-based buffer. Moving object segmentation generally refers to the process of using the frames in the time-based buffer to segment out moving objects, such as moving automobiles, pedestrians, or cyclists, from non-moving (i.e., stationary) objects such as parked automobiles, trees, signs, road surfaces, and other structures. The non-moving objects collectively form what may be generally referred to herein as a static scene. As part of moving object segmentation, an ADAS may assign each point of a point cloud or each pixel of an image as belonging to either a moving object or the static scene. For objects determined to be moving objects, the ADAS can predict the trajectory of the moving objects and control navigation of the vehicle accordingly.

ADASs using temporal aggregation can effectively track and predict the trajectory of moving objects as long as the objects are moving with a sufficient speed, for example greater than 3-5 km/h. ADASs using temporal aggregation, however, often times perform poorly with respect to tracking and predicting the trajectory of slower moving objects such as pedestrians and perform particularly poorly with respect to tracking and predicting the trajectory of slow, decelerating objects, such as cars pulling up to stop signs.

To enable ADASs to more effectively track and predict the trajectory of slower moving objects, this disclosure describes techniques for configuring an ADAS to maintain a distance-based buffer of frames in lieu of or in addition to a time-based buffer. An ADAS may, for example, store one frame in the distance-based buffer per a unit of distance that the vehicle that includes the ADAS travels. As one example, the ADAS may store one frame every 1 or 2 meters travelled by the ADAS, e.g., by a vehicle that incorporated the ADAS. Once a buffer is at capacity, an oldest frame in the time-based buffer may be removed when a new frame is added. This approach for maintaining a distance-based buffer may be referred to herein as equidistant aggregation.

By storing a time-based buffer with a first set of frames acquired by a sensor and storing a distance-based buffer with a second set of frames acquired by the sensor, the techniques of this disclosure may enable an ADAS to better recognize, and navigate around, slower moving objects. The techniques of this disclosure may be particularly applicable to driving scenarios where a vehicle with an ADAS is driving at moderate speeds, e.g., 40-55 km/h, in close proximity to objects moving at relatively slower speeds, e.g., less than 10 km/h, as commonly occurs in urban or neighborhood driving scenarios. The techniques of this disclosure may also be particularly applicable to driving scenarios where a vehicle with an ADAS is driving at a slow speed and needs to navigate around other slow moving objects. In such a scenario, a distance-based buffer as disclosed herein may store frames that cover a larger time window and thus better enable the ADAS to track and predict the movement of slow moving objects that exhibit minimal movement in the frames stored in a time-based buffer.

According to an example of this disclosure, an apparatus for navigation includes: a memory configured to store a time-based buffer with a first set of frames acquired from a sensor and a distance-based buffer with a second set of frames acquired from the sensor; one or more processors implemented in circuitry, in communication with the memory, and configured to: perform moving object segmentation on the first set of frames and the second set of frames to identify at least one moving object in a scene of the first set of frames and the second set of frames; predict a trajectory of the at least one moving object; and perform a navigation function based on the predicted trajectory.

According to an example of this disclosure, a method for navigation includes: storing, in a time-based buffer, a first set of frames acquired by a sensor; storing, in a distance-based buffer, a second set of frames acquired by the sensor; performing moving object segmentation on the first set of frames and the second set of frames to identify at least one moving object in a scene of the first set of frames and the second set of frames; predicting a trajectory of the at least one moving object; and performing a navigation function based on the predicted trajectory.

A computer-readable storage medium stores instructions that when executed by one or more processors cause the one or more processors to: store, in a time-based buffer, a first set of frames acquired by a sensor; store, in a distance-based buffer, a second set of frames acquired by the sensor; perform moving object segmentation on the first set of frames and the second set of frames to identify at least one moving object in a scene of the first set of frames and the second set of frames; predict a trajectory of the at least one moving object; and perform a navigation function based on the predicted trajectory.

According to an example of this disclosure, an apparatus for navigation includes: means for storing, in a time-based buffer, a first set of frames acquired by a sensor; means for storing, in a distance-based buffer, a second set of frames acquired by the sensor; means for performing moving object segmentation on the first set of frames and the second set of frames to identify at least one moving object in a scene of the first set of frames and the second set of frames; means for predicting a trajectory of the at least one moving object; and means for performing a navigation function based on the predicted trajectory.

The details of one or more examples are set forth in the accompanying drawings and the description below. Other features, objects, and advantages will be apparent from the description, drawings, and claims.

DETAILED DESCRIPTION

Figure 1:
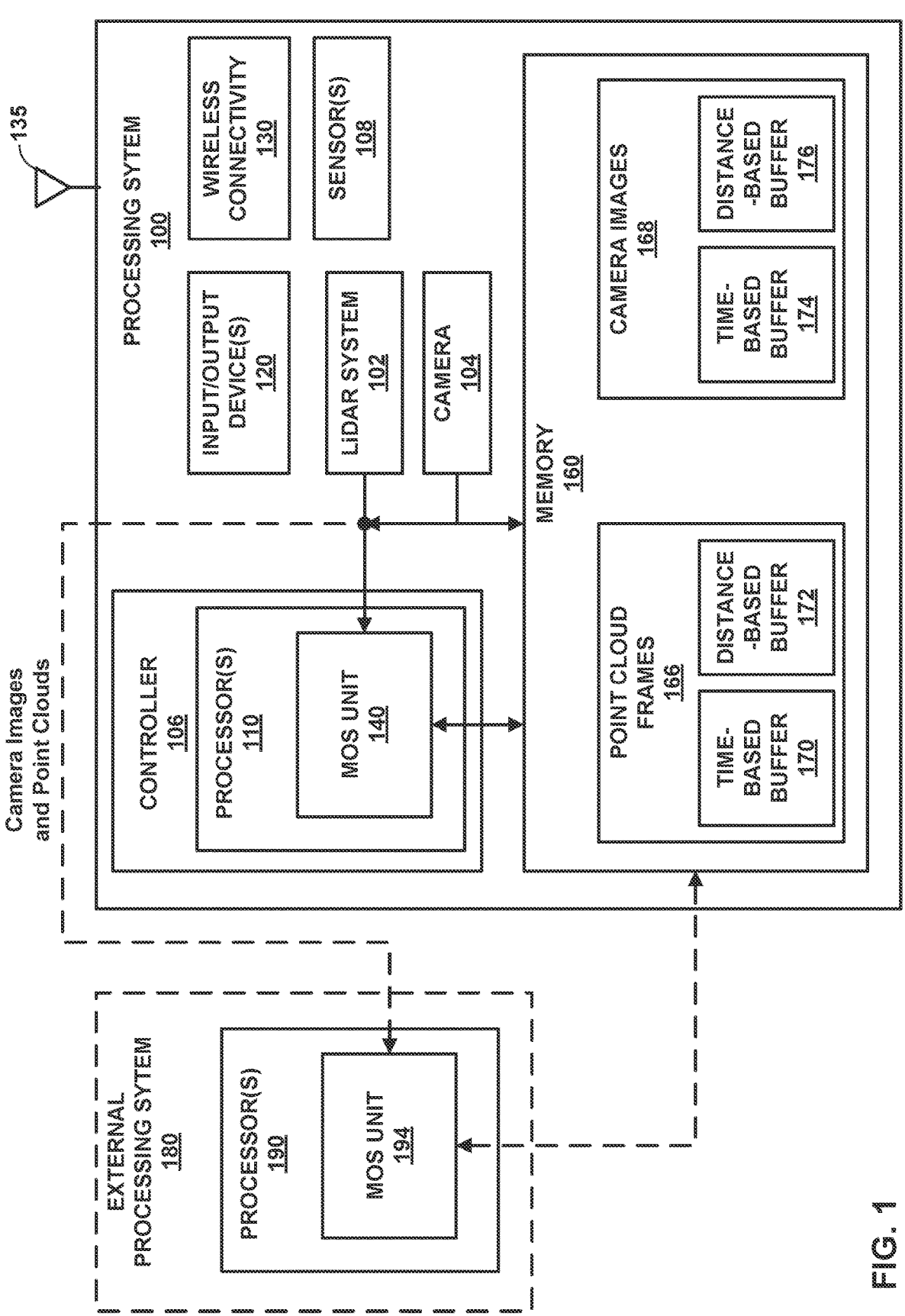
FIG. 1 is a block diagram illustrating an example processing system according to one to more aspects of this disclosure.

Camera and LiDAR systems may be used together in various different robotic and vehicular applications. One such vehicular application is an advanced driver assistance system (ADAS). ADAS is a system that utilizes both camera and LiDAR sensor technology to improve driving safety, comfort, and overall vehicle performance. This system combines the strengths of both sensors to provide a more comprehensive view of a vehicle's surroundings, enabling the ADAS to better assist the driver in various driving scenarios.

In some examples, the camera-based system is responsible for capturing high-resolution images and processing the images in real time. The output images of such a camera-based system may be used in applications such as depth estimation, object detection, and/or pose detection, including the detection and recognition of objects, such as other vehicles, pedestrians, traffic signs, and lane markings. Cameras may be particularly good at capturing color and texture information, which is useful for accurate object recognition and classification.

LiDAR sensors emit laser pulses to measure the distance, shape, and positioning of objects around the vehicle. LiDAR sensors provide 3D data, enabling the ADAS to create a detailed map of the surrounding environment. LiDAR may be particularly effective in low-light or certain adverse weather conditions, where camera performance may be hindered. In some examples, the output of a LiDAR sensor may be used as partial ground truth data for performing neural network-based depth information on corresponding camera images.

By fusing the data gathered from both camera and LiDAR sensors, the ADAS can deliver enhanced situational awareness and improved decision-making capabilities. This enables various driver assistance features such as adaptive cruise control, lane keeping assist, pedestrian detection, automatic emergency braking, and parking assistance. The combined system can also contribute to the development of semi-autonomous and fully autonomous driving technologies, which may lead to a safer and more efficient driving experience.

An ADAS may be configured to maintain a time-based buffer of frames. The frames may be either point clouds or images. The ADAS may, for example, store one frame per a unit of time in the time-based buffer. As one example, the ADAS may store one frame every 0.1 seconds, i.e., 10 frames per second, in the time-based buffer. Other rates may also be used. Once a buffer is at capacity, an oldest frame in the time-based buffer may be removed when a new frame is added. This approach for maintaining a time-based buffer may be referred to herein as temporal aggregation.

To implement the navigation functionality described above, the ADAS may be configured to perform moving object segmentation using the frames in the time-based buffer. Moving object segmentation generally refers to the process of using the frames in the time-based buffer to segment out moving objects, such as moving automobiles, pedestrians, or cyclists, from non-moving (i.e., stationary) objects such as parked automobiles, trees, signs, road surfaces, and other structures. The non-moving objects collectively form what may be generally referred to herein as a static scene. As part of moving object segmentation, an ADAS may assign each point of a point cloud or each pixel of an image as belonging to either a moving object or the static scene. For objects determined to be moving objects, the ADAS can predict the trajectory of the moving objects and control navigation of the vehicle accordingly.

ADASs using temporal aggregation can effectively track and predict the trajectory of moving objects as long as the objects are moving with a sufficient speed, for example greater than 3-5 km/h. ADASs using temporal aggregation, however, often times perform poorly with respect to tracking and predicting the trajectory of slower moving objects such as pedestrians and perform particularly poorly with respect to tracking and predicting the trajectory of slow, decelerating objects, such as cars pulling up to stop signs.

To enable ADASs to more effectively track and predict the trajectory of slower moving objects, this disclosure describes techniques for configuring an ADAS to maintain a distance-based buffer of frames in lieu of or in addition to a time-based buffer. An ADAS may, for example, store one frame per a unit of distance travelled by the ADAS in the distance-based buffer. As one example, the ADAS may store one frame every 1 or 2 meters travelled. Once a buffer is at capacity, an oldest point cloud in the time-based buffer may be removed when a new point cloud is added. This approach for maintaining a distance-based buffer may be referred to herein as equidistant aggregation.

By storing a time-based buffer with a first set of frames acquired by a sensor and storing a distance-based buffer with a second set of frames acquired by the sensor, the techniques of this disclosure may enable an ADAS to better recognize, and navigate around, slower moving objects. The techniques of this disclosure may be particularly applicable to driving scenarios where a vehicle with an ADAS is driving at moderate speeds, e.g., 40-55 km/h, in close proximity to objects moving at relatively slower speeds, e.g., less than 10 km/h, as commonly occurs in urban or neighborhood driving scenarios. The techniques of this disclosure may also be particularly applicable to driving scenarios where a vehicle with an ADAS is driving at a slow speed and needs to navigate around other slow moving objects. In such a scenario, a distance-based buffer as disclosed herein may store frames that cover a larger time window and thus better enable the ADAS to track and predict the movement of slow moving objects that exhibit minimal movement in the frames stored in a time-based buffer. Slow moving objects may constitute vulnerable road users (VRUs), such as pedestrians or bicycles, or risk-inducing objects (RIOs), such as vehicles which are accelerating into the same intersection from a complete halt at a stop sign. Avoiding VRUs and RIOs is a challenging, but necessary, aspect of automated navigation.

FIG. 1 is a block diagram illustrating an example processing system according to one to more aspects of this disclosure. Processing system 100 may be used in a vehicle, such as an autonomous driving vehicle or an assisted driving vehicle (e.g., a vehicle having an ADAS or an "ego vehicle"). In such an example, processing system 100 may represent an ADAS. In other examples, processing system 100 may be used in other robotic applications that may include both a camera and a LiDAR system.

Processing system 100 may include LiDAR system 102, camera 104, controller 106, one or more sensor(s) 108, input/output device(s) 120, wireless connectivity component 130, and memory 160. LiDAR system 102 may include one or more light emitters (e.g., lasers) and one or more light sensors. LiDAR system 102 may be deployed in or about a vehicle. For example, LiDAR system 102 may be mounted on a roof of a vehicle, in bumpers of a vehicle, and/or in other locations of a vehicle. LiDAR system 102 may be configured to emit light pulses and sense the light pulses reflected off of objects in the environment. LiDAR system 102 may emit such pulses in a 360 degree field around so as to detect objects within the 360 degree field, such as objects in front of, behind, or beside a vehicle. While described herein as including LiDAR system 102, it should be understood that another distance or depth sensing system may be used in place of LiDAR system 102. The output of LiDAR system 102 are called point clouds or point cloud frames.

A point cloud frame output by LiDAR system 102 is a collection of 3D data points that represent the surface of objects in the environment. These points are generated by measuring the time it takes for a laser pulse to travel from the sensor to an object and back. Each point in the cloud has at least three attributes: x, y, and z coordinates, which represent its position in a Cartesian coordinate system. Some LiDAR systems also provide additional information for each point, such as intensity, color, and classification.

Intensity (also called reflectance) is a measure of the strength of the returned laser pulse signal for each point. The value of the intensity attribute depends on various factors, such as the reflectivity of the object's surface, distance from the sensor, and the angle of incidence. Intensity values can be used for several purposes, including distinguishing different materials, and enhancing visualization. Intensity values can be used to generate a grayscale image of the point cloud, helping to highlight the structure and features in the data.

Color information in a point cloud is usually obtained from other sources, such as digital cameras mounted on the same platform as the LiDAR sensor, and then combined with the LiDAR data. The color attribute consists of color values (e.g., red, green, and blue (RGB)) values for each point. The color values may be used to improve visualization and aid in enhanced classification (e.g., the color information can aid in the classification of objects and features in the scene, such as vegetation, buildings, and roads.)

Classification is the process of assigning each point in the point cloud to a category or class based on its characteristics or its relation to other points. The classification attribute may be an integer value that represents the class of each point, such as ground, vegetation, building, water, etc. Classification can be performed using various algorithms, often relying on machine learning techniques or rule-based approaches.

Camera 104 may be any type of camera configured to capture video or image data in the environment around processing system 100 (e.g., around a vehicle). For example, camera 104 may include a front facing camera (e.g., a front bumper camera, a front windshield camera, and/or a dashcam), a back facing camera (e.g., a backup camera), side facing cameras (e.g., cameras mounted in sideview mirrors). Camera 104 may be a color camera or a grayscale camera. In some examples, camera 104 may be a camera system including more than one camera sensor. While techniques of this disclosure will be described with reference to a 2D photographic camera, the techniques of this disclosure may be applied to the outputs of other sensors that capture information at a higher frame rate than a LiDAR sensor, including a sonar sensor, a radar sensor, an infrared camera, and/or a time-of-flight (ToF) camera.

Wireless connectivity component 130 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 130 is further connected to one or more antennas 135.

Processing system 100 may also include one or more input and/or output devices 120, such as screens, touch-sensitive surfaces (including touch-sensitive displays), physical buttons, speakers, microphones, and the like. Input/output device(s) 120 (e.g., which may include an I/O controller) may manage input and output signals for processing system 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processor(s) 110). In some cases, a user may interact with a device via input/output device(s) 120 or via hardware components controlled by input/output device(s) 120.

Controller 106 may be an autonomous or assisted driving controller (e.g., an ADAS) configured to control operation of processing system 100 (e.g., including the operation of a vehicle). For example, controller 106 may control acceleration, braking, and/or navigation of vehicle through the environment surrounding vehicle. Controller 106 may include one or more processors, e.g., processor(s) 110. Processor(s) 110 may include one or more central processing units (CPUs), such as single-core or multi-core CPUs, graphics processing units (GPUs), digital signal processor (DSPs), neural processing unit (NPUs), multimedia processing units, and/or the like. Instructions executed by processor(s) 110 may be loaded, for example, from memory 160 and may cause processor(s) 110 to perform the operations attributed to processor(s) 110 in this disclosure. In some examples, one or more of processor(s) 110 may be based on an ARM or RISC-V instruction set.

An NPU is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processor(s) 110 may also include one or more sensor processing units associated with LiDAR system 102, camera 104, and/or sensor(s) 108. For example, processor(s) 110 may include one or more image signal processors associated with camera 104 and/or sensor(s) 108, and/or a navigation processor associated with sensor(s) 108, which may include satellite-based positioning system components (e.g., GPS or GLONASS) as well as inertial positioning system components. In some aspects, sensor(s) 108 may include direct depth sensing sensors, which may function to determine a depth of or distance to objects within the environment surrounding processing system 100 (e.g., surrounding a vehicle).

Processing system 100 also includes memory 160, which is representative of one or more static and/or dynamic memories, such as a dynamic random access memory, a flash-based static memory, and the like. In this example, memory 160 includes computer-executable components, which may be executed by one or more of the aforementioned components of processing system 100.

Examples of memory 160 include random access memory (RAM), read-only memory (ROM), or a hard disk. Examples of memory 160 include solid state memory and a hard disk drive. In some examples, memory 160 is used to store computer-readable, computer-executable software including instructions that, when executed, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 160 store information in the form of a logical state.

Processing system 100 and/or components thereof may be configured to perform the techniques described herein. For example, memory 160 may store a first set of point cloud frames 166 in time-based buffer 170 and a second set of point cloud frames 166 in distance-based buffer 172. Memory 160 may additionally or alternatively store a first set of camera images 168 in time-based buffer 174 and a second set of camera images 168 in distance-based buffer 176. Although shown as being distinct for purposes of illustration, time-based buffer 170 and distance-based buffer 172 may in fact be implement as a single buffer, and processor(s) 110 may perform equidistant-temporal aggregation on the single point cloud buffer. That is, processor(s) 110 may add some point cloud frames to the single buffer based on time and add other point cloud frames to the single buffer based on distance in the manner described herein. Similarly, although shown as being distinct for purposes of illustration, time-based buffer 174 and distance-based buffer 176 may in fact be implement as a single buffer, and processor(s) 110 may perform equidistant-temporal aggregation on the single image buffer. That is, processor(s) 110 may add some images to the single buffer based on time and add other images to the single buffer based on distance in the manner described herein.

Processor(s) 110, e.g., MOS unit 140, may perform moving object segmentation on the first set of point clouds stored in time-based buffer 170 and the second set of point clouds stored in distance-based buffer 172 to identify at least one moving object in a scene of the point clouds. Processor(s) 110, e.g., MOS unit 140, may additionally or alternatively perform moving object segmentation on the first set of camera stored in time-based buffer 174 and the second set of camera images stored in distance-based buffer 176 to identify the at least one moving object in a scene of the point clouds.

Figures 2A, 2B:
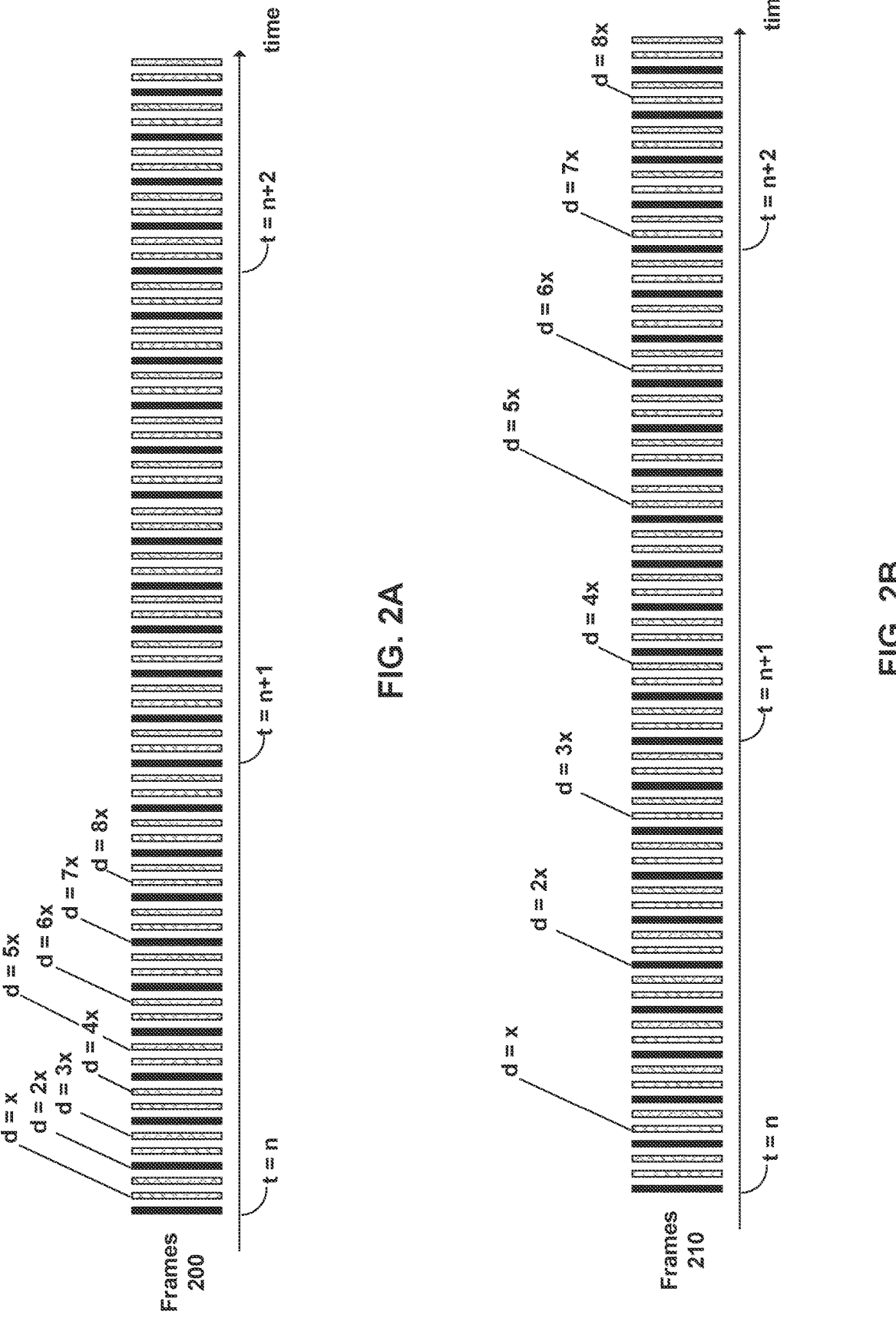
FIGS. 2A and 2B are diagrams illustrating the storing of frames into time-based buffers and distance-based buffers according to one to more aspects of this disclosure.

FIG. 2A is a diagram illustrating the storing of frames 200, acquired by a sensor, into time-based buffers and distance-based buffers according to one or more aspects of this disclosure. Frames 200 may, for example, correspond to point cloud frames 166 or camera images 168 of FIG. 1, and the sensor may correspond to LiDAR system 102 or camera 104. The time-based buffer may correspond to time-based buffer 170 or time-based buffer 174, and the distance-based buffer may correspond to distance-based buffer 172 or distance-based buffer 176. The techniques of this disclosure generally, and FIG. 2A specifically, however, may be applicable to other types of frames acquired by other sensors, e.g., sensor(s) 108.

In the example of FIG. 2A, the sensor acquires frames 200 at a rate of 30 frames per time unit n. In the case of a camera, n may, for example, corresponds to one-half of a second, one second, two seconds, or three seconds, meaning the sensor would be acquiring frames 200 at a rate of 60 Hz, 30 Hz, 15 Hz, or 10 Hz, respectively. In the case of a LiDAR, n may, for example, correspond to 2 seconds or 3 seconds, which are equivalent to 15 Hz and 10 Hz respectively. These values of n are non-limiting examples, and it should be understood that other values of n may also be used.

Processor(s) 110 may, however, store only subsets of frames 200 into the distance-based buffers and time-based buffers. In the example of FIG. 2A, processor(s) 110 store frames into the time-based buffer at a rate of 10 frames per time unit n, meaning processor(s) 110 store all of the solid black frames in FIG. 2A into the time-based buffer and does not store the hatched frames into the time-based buffer. Thus, if the sensor is acquiring frames at a rate of 30 frames per second, then processor(s) 110 store frames into the time-based buffer at a rate of 10 frames per second.

Processor(s) 110 may store a different, but possibly somewhat overlapping, subset of frames 200 into the distance-based buffer. Processor(s) 110 may, for example, monitor a distance moved by sensor and add a new frame acquired by the sensor to the distance-based buffer in response to the system having moved a threshold unit of distance. In the example of FIG. 2A, the threshold unit of distance of is shown as x. The value of x may, for example, be between 0.5 to 2.5 meters; however, other distances may also be used. As explained in more detail below, processing system 100 may adaptively change the value of x based on changes in the scene detected by processing system 100.

In the example of FIG. 2A, frames acquired at $d=x$, $d=2x$, $d=3x$, $d=4x$, $d=5x$, $d=6x$, $d=7x$, $d=8x$, etc. are stored in the distance-based buffer. Thus, the frames stored in the distance-based buffer may be considered to be equidistant even if not captured at equal time intervals. In the example of FIG. 2A, the amount of time for the sensor to move distance λ increases over time, meaning the sensor, e.g., a vehicle to which the sensor is mounted, is decelerating.

FIG. 2B is a diagram illustrating the storing of frames 210, acquired by a sensor, into time-based buffers and distance-based buffers according to one or more aspects of this disclosure. Frames 210 may, for example, correspond to point cloud frames 166 or camera images 168 of FIG. 1, and the sensor may correspond to LiDAR system 102 or camera 104. The time-based buffer may correspond to time-based buffer 170 or time-based buffer 174, and the distance-based buffer may correspond to distance-based buffer 172 or distance-based buffer 176. The techniques of this disclosure generally, and FIG. 2B specifically, however, may be applicable to other types of frames acquired by other sensors, e.g., sensor(s) 108.

In the example of FIG. 2B, the sensor acquires frames 210 at a rate of 30 frames per time unit n. In the case of a camera, n may, for example, corresponds to one-half of a second, one second, two seconds, or three seconds, meaning the sensor would be acquiring frames 210 at a rate of 60 Hz, 30 Hz, 15 Hz, or 10 Hz, respectively. In the case of a LiDAR, n may, for example, correspond to 2 seconds or 3 seconds, which are equivalent to 15 Hz and 10 Hz respectively. These values of n are non-limiting examples, and it should be understood that other values of n may also be used.

Processor(s) 110 may, however, store only subsets of frames 210 into the distance-based buffers and time-based buffers. In the example of FIG. 2B, processor(s) 110 store frames into the time-based buffer at a rate of 10 frames per time unit n, meaning processor(s) 110 store all of the solid black frames in FIG. 2B into the time-based buffer and does not store the hatched frames into the time-based buffer. Thus, if the sensor is acquiring frames at a rate of 30 frames per second, then processor(s) 110 store frames into the time-based buffer at a rate of 10 frames per second.

Processor(s) 110 may store a different, but possibly somewhat overlapping, subset of frames 210 into the distance-based buffer. Processor(s) 110 may, for example, monitor a distance moved by sensor and add a new frame acquired by the sensor to the distance-based buffer in response to the system having moved a threshold unit of distance. In the example of FIG. 2B, the threshold unit of distance of is shown as x. The value of x may, for example, be between 0.5 to 2.5 meters; however, other distances may also be used.

In the example of FIG. 2B, frames acquired at d=x, d=2x, d=3x, d=4x, d=5x, d=6x, d=7x, d=8x, etc. are stored in the distance-based buffer. Thus, the frames stored in the distance-based buffer may be considered to be equidistant even if not captured at equal time intervals. In the example of FIG. 2B, in contrast to the example of FIG. 2A, frames are added to the distance-based buffer more slowly than frames are added to the time-based buffer, meaning that the sensor, e.g., a vehicle to which the sensor is mounted, is moving relatively slowly (e.g., slower than example of FIG. 2A). Thus, in the example of FIG. 2B, the distance-based buffer includes frames for a longer period of time than does the time-based buffer, which may improve navigation functionality for certain driving scenarios, particularly scenarios where an ego vehicle is moving slowly and needs to track other slow moving objects. As one example, the techniques of this disclosure may be particularly valuable in a driving scenario, where an ego vehicle is crossing an intersection and another vehicle stopped at the intersection is beginning to accelerate. Distance-based aggregation of frames, as described in this disclosure, may enable an ADAS to better track and predict movement of the other vehicle in this scenario when compared to only using temporal-based aggregation.

Figure 3:
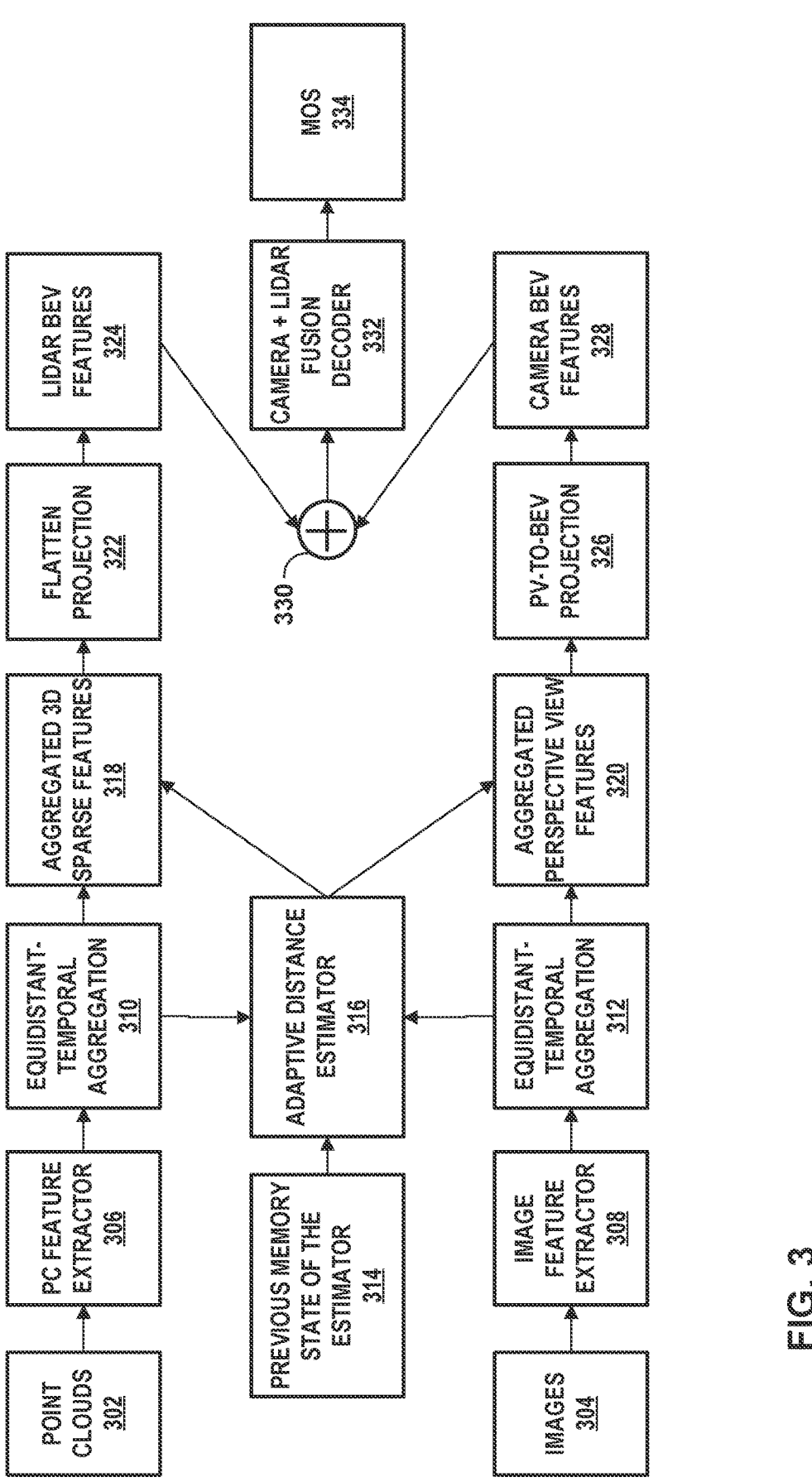
FIG. 3 is a flowchart illustrating an example process for using time-based buffers of point clouds and images and distance-based buffers of point clouds and images for performing moving object segmentation.

FIG. 3 is a flowchart illustrating an example process for using time-based buffers of point clouds and images and distance-based buffers of point clouds and images for perform moving object segmentation. In the example of FIG. 3, processing system 100 acquires point clouds (302) and acquires images (304). The point clouds and images may constitute raw data acquired by sensors, such as LiDAR system 102 and camera 104, respectively.

Processing system 100 performs point-cloud feature extraction (306) on the acquired point clouds and performs image features extraction (308) on the acquired images. Processing system 100 may, for example, identify shapes, lines, or other features in the point clouds and images that may correspond to real-world objects of interest. Performing feature extraction on the raw data may reduce the amount of data in the frames as some information in the point clouds and images may be removed. For example, data corresponding to unoccupied voxels of a point cloud may be removed.

Processing system 100 performs equidistant-temporal aggregation (310) on the acquired point clouds. That is, processing system 100 may identify a first subset of point clouds based on a frequency (i.e., time based) and a second subset of point clouds based on a distance moved by processing system 100 (i.e., distance based). Processing system 100 also performs equidistant-temporal aggregation (312) on the acquired images. That is, processing system 100 may identify a first subset of images based on a frequency (i.e., time based) and a second subset of images based on a distance moved by processing system 100 (i.e., distance based).

The optimal aggregation distance for equidistant aggregation may vary based on traffic flow, ego sensor configurations, weather conditions, or numerous other criteria. Accordingly, processing system 100 implements an adaptive distance estimator (316) to determine a threshold unit distance for performing equidistant aggregation. The threshold unit of distance may be the same for both distance-based aggregation of images and distance-based aggregation of point clouds, or different thresholds may be used for each. Processing system 100 may, for example, store a previous memory state of the estimator (314) and implement the adaptive distance estimator (316) to determine if the threshold unit of distance is to be estimated.

The adaptive distance estimator may incorporate an online sequence-to-sequence model to estimate an optimal aggregation distance. Given the previously estimated distances $(d_{-k}, d_{-k+1}, \ldots, d_{-1}, d_0)$ within a finite horizon $(-k, -k+1, \ldots, -1, 0)$, the model predicts the next optimal distance di for the incoming frame. The sequence-to-sequence model can be implemented, for example, with deep learning methods, such as the transformer architecture with cross-modal attention between the sensors. The key and value inputs for the cross-modal attention may be obtained from previous timestamps/sequences of camera features, and the query may correspond to the point cloud features.

After performing equidistant-temporal aggregation (310) for points clouds based on a fixed frequency and a threshold unit of distance, processing system 100 stores a set of aggregated 3D sparse features (318). That is, processing system 100 may maintain a time-based buffer (e.g., time-based buffer 170) with a first set of point cloud frames and maintain a distance-based buffer (e.g., distance-based buffer 172) with a second set of point cloud frames. The point clouds in the time-based buffer and distance-based buffer, due to feature extraction and/or down sampling, may have reduced data relative to the raw data acquired by LiDAR system 102. Processing system 100 adds new point clouds to the time-based buffer at a fixed frequency and adds new point clouds to the distance-based buffer in response to processing system 100 having moved a threshold unit of distance.

After performing equidistant-temporal aggregation (312) for images based on a fixed frequency and a threshold unit of distance, processing system 100 stores a set of aggregated perspective view features (320). That is, processing system 100 maintains a time-based buffer (e.g., time-based buffer 174) with a first set of images and maintains a distance-based buffer (e.g., distance-based buffer 176) with a second set of images. The images in the time-based buffer and distance-based buffer, due to feature extraction and/or down sampling, may have reduced data relative to the raw data acquired by camera 104. Processing system 100 adds new images to the time-based buffer at a fixed frequency and adds new images to the distance-based buffer in response to processing system 100 having moved a threshold unit of distance.

Processing system 100 performs flatten projection (322) on the point cloud frames, e.g., on the aggregated 3D sparse features. Flatten projection converts the 3D point cloud data into 2D data, which creates a birds-eye-view (BEV) perspective of the point cloud (324), e.g., data indicative of LiDAR BEV features in the point clouds. Processing system 100 performs perspective view (PV)-to-BEV projection (326) on the images, e.g., the aggregated perspective view features. PV-to-BEV projection converts the image data into 2D BEV data, using for example matrix multiplication, which creates data indicative of camera BEV features (328).

Each point cloud frame, e.g., each aggregated 3D sparse feature (318), and each image, e.g., each aggregated perspective view features (320) may have associated time-stamp, location, and pose information. Based on the time-stamp, location (e.g., GPS location), and pose information for the point cloud frames and the images, processing system 100 may transform the images to be in the same coordinate domain as the point cloud frames or may shift the point clouds to be in the same coordinate domain as the images.

The LiDAR BEV features and the camera BEV features are combined (330) and input into a camera/LiDAR fusion decoder (332). The fusion decoder extracts features from a feature space and decodes those features into a scene space corresponding to the originally-acquired point clouds and images. Processing system 100 then performing moving object segmentation (334) on the features to determine if features correspond to static objects or moving objects. Processing system 100 may then predict intended movements of moving objects. For example, processing system 100 may predict whether a pedestrian intends to cross a street or turn a corner, or whether a car intends to stop at a stop sign.

Based on the predicted intended movements, processing system 100 may perform a navigation function based on the predicted trajectory. For example, processing system 100 may cause an ego vehicle to accelerate, decelerate, stop, The techniques of this disclosure may also be performed by external processing system 180. External processing system 180 may include processor(s) 190, which may be any of the types of processors described above for processor(s) 110. Processor(s) 190 may acquire point cloud frames 166 and camera images 168 directly from LiDAR system 102 and camera 104, respectively, or from memory 160. Though not shown, external processing system 180 may also include a memory that may be configured to store point cloud frames.

Figure 4:
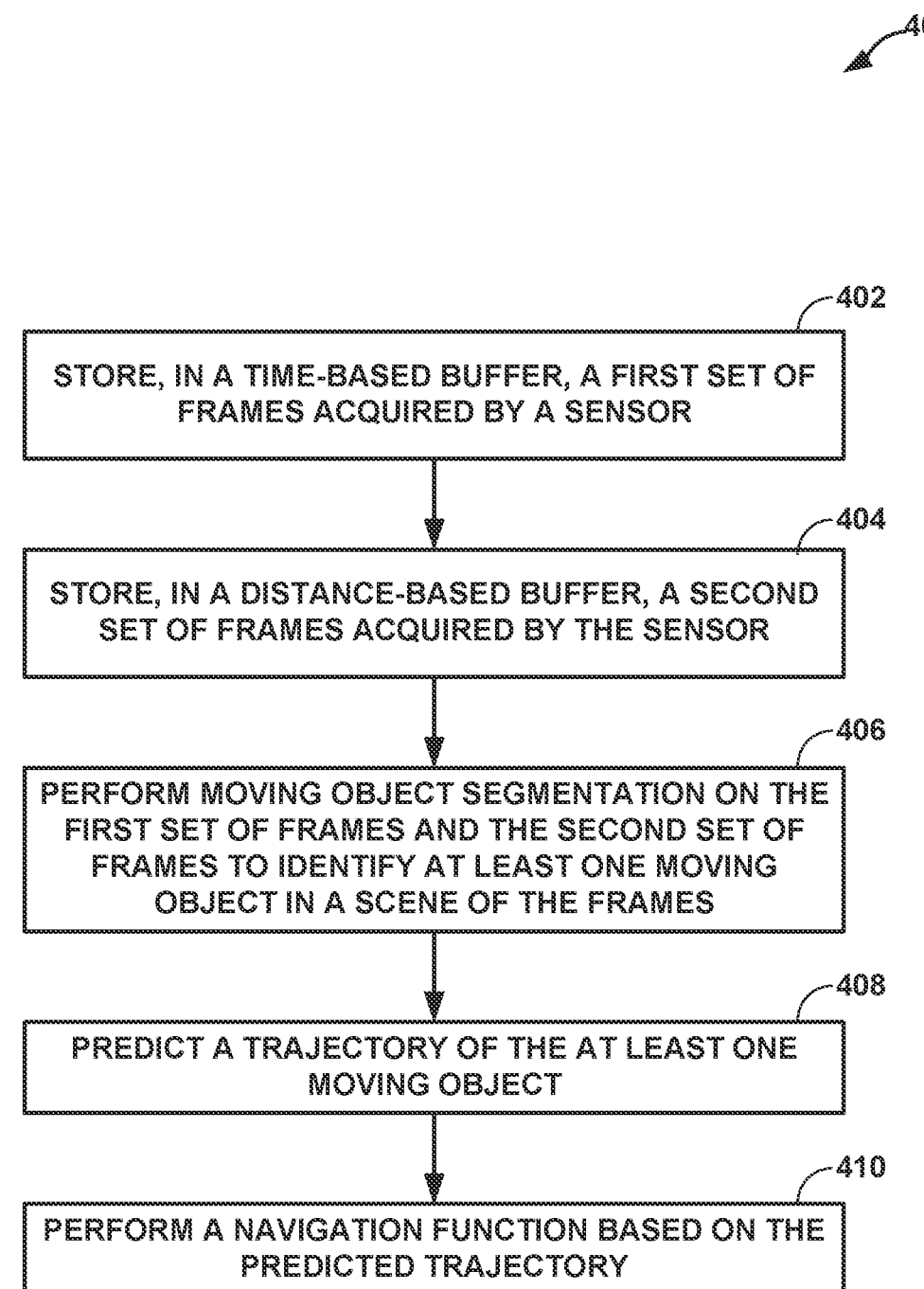
FIG. 4 is a flowchart illustrating an example process for using a time-based buffer of frames and a distance-based buffer of frames for navigation.

FIG. 4 is a flowchart illustrating an example process for using a time-based buffer of point clouds and a distance-based buffer of point clouds for navigation. The techniques of FIG. 4 may be performed by one or more processors of processing system 100 or external processing system 180.

The one or more processors store, in a time-based buffer, a first set of frames acquired by a sensor (402). The sensor may, for example, be a point cloud acquiring device, such as a LiDAR, and the frames may be point cloud frames. In other examples, the sensor may be an image acquiring device, such as a camera, and the frames may be images.

The one or more processors may add new frames to the time-based buffer at a fixed frequency. That is, the one or more processors may add new frames to the time-based buffer at fixed time intervals. In some examples, the sensor may acquire frames at a higher frequency than the frequency at which the frames are stored. For instance, the sensor may acquire frames at 30 or 60 frames per second but store frames in the time-based buffer at 10 or 15 frames per second, such that not all frames acquired by the second are stored in the time-based buffer.

The one or more processors store, in a distance-based buffer, a second set of frames acquired by the sensor (404). The one or more processors may, for example, monitor a distance moved by the sensor and add a new frame acquired by the sensor to the distance-based buffer in response to the sensor having moved a threshold unit of distance. In this context, the terms distance refers to a distance moved. The one or more processors may be configured to dynamically determine the threshold unit of distance based on a speed of the sensor, a GPS location of the sensor, weather conditions, traffic flow, configurations of other sensor, or some other criteria. In these examples, the distance moved by the sensor, the speed of the sensor, the GPS location of the sensor, and other such characteristics of the sensor may be assumed to be the same as the distance moved by, the speed of, or the GPS location of a vehicle to which the sensor is mounted. For example, an odometer of the vehicle or a GPS tracking of the vehicle may be used to determine movement of the sensor.

In response to adding the new frames to the distance-based buffer, the one or more processors may be configured to remove an oldest frame from the distance-based buffer. The oldest frame may, for example, be a most-distant, or farthest away from a current location, frame.

It should be understood that the frames stored in the time-based buffers and the distance-based buffers may not necessarily be the full frames, e.g., all of the raw data, acquired by the sensor. As explained above with respect to the example of FIG. 3, the frames stored in the time-based buffer and distance-based buffer may correspond to extracted features from the raw data.

The one or more processors perform moving object segmentation on the first set of frames and the second set of frames to identify at least one moving object in a scene of the point clouds (406). The one or more processors predict a trajectory of the at least one moving object (408). Generally speaking, the one or more processors may perform moving object segmentation for scene understanding, such as intent prediction and motion planning. The one or more processors perform a navigation function based on the predicted trajectory (410). The one or more processors may, for example, determine a time to collision based on the trajectory of the at least one moving object and a trajectory of the vehicle and perform the navigation function based on the predicted trajectory.

The following numbered clauses illustrate one or more aspects of the devices and techniques described in this disclosure.

Clause 1: An apparatus for navigation, the apparatus comprising: a memory configured to store a time-based buffer with a first set of frames acquired from a sensor and a distance-based buffer with a second set of frames acquired from the sensor; one or more processors implemented in circuitry, in communication with the memory, and configured to: perform moving object segmentation on the first set of frames and the second set of frames to identify at least one moving object in a scene of the first set of frames and the second set of frames; predict a trajectory of the at least one moving object; and perform a navigation function based on the predicted trajectory.

Clause 2: The apparatus of clause 1, wherein the one or more processors are further configured to: monitor a distance moved by the sensor; and add a new frame acquired by the sensor to the distance-based buffer in response to the sensor having moved a threshold unit of distance.

Clause 3: The apparatus of clause 2, wherein the one or more processors are further configured to: in response to adding the new frames to the distance-based buffer, remove an oldest frame from the distance-based buffer.

Clause 4: The apparatus of clause 2 or 3, wherein the one or more processors are configured to dynamically determine the threshold unit of distance based on a speed of the sensor.

Clause 5: The apparatus of any of clauses 2-4, wherein the one or more processors are configured to dynamically determine the threshold unit of distance based a GPS location of the sensor.

Clause 6: The apparatus of any of clauses 1-5, wherein the one or more processors are further configured to: add new frames to the time-based buffer at a fixed frequency.

Clause 7: The apparatus of any of clauses 1-6, wherein the one or more processors are further configured to: determine a time to collision based on the trajectory of the at least one moving object and a trajectory of the sensor; and perform the navigation function based on the predicted trajectory.

Clause 8: The apparatus of any of clauses 1-7, wherein the sensor comprises an image acquiring device and wherein the frames comprises images acquired by the image acquiring device.

Clause 9: The apparatus of any of clauses 1-8, wherein the sensor comprises a point cloud acquiring device and wherein the frames comprise point cloud frames.

Clause 10: The apparatus of clause 9, wherein the point cloud acquiring device comprises a LiDAR sensor configured to capture point clouds, and wherein the one or more processors are part of an advanced driver assistance system (ADAS).

Clause 11: The apparatus of any of clauses 1-10 wherein, the memory is further configured to store a second time-based buffer with a first set of images acquired by an image acquiring device and a second distance-based buffer with a second set of images acquired by the image acquiring device; the one or more processors are configured to perform the moving object segmentation on the first set of point clouds, the second set of point clouds, the first set of images, and the second set of images to identify the at least one moving object in the scene of the point clouds.

Clause 12: The apparatus of clause 11, wherein the one or more processors are further configured to: add a new image acquired by the image acquiring device to the second distance-based buffer in response to the image acquiring device having moved a second threshold unit of distance.

Clause 13: The apparatus of clause 12, wherein the one or more processors are configured to dynamically determine the second threshold unit of distance based on a speed of the image acquiring device.

Clause 14: The apparatus of any of clauses 11-13, wherein the one or more processors are further configured to: add new image to the second time-based buffer at a fixed frequency.

Clause 15: The apparatus of any of clauses 11-14, wherein the image acquiring device comprises a camera.

Clause 16: The apparatus of any of clauses 1-15, wherein the one or more processors are external to an advanced driver assistance system (ADAS).

Clause 17: A method for navigation, the method comprising: storing, in a time-based buffer, a first set of frames acquired by a sensor; storing, in a distance-based buffer, a second set of frames acquired by the sensor; performing moving object segmentation on the first set of frames and the second set of frames to identify at least one moving object in a scene of the first set of frames and the second set of frames; predicting a trajectory of the at least one moving object; and performing a navigation function based on the predicted trajectory.

Clause 18: The method of clause 17, further comprising: monitoring a distance moved by the sensor; and adding a new frame acquired by the sensor to the distance-based buffer in response to the sensor having moved a threshold unit of distance.

Clause 19: The method of clause 18, further comprising: in response to adding the new frame to the distance-based buffer, removing an oldest frame from the distance-based buffer.

Clause 20: The method of any of clauses 17-19, further comprising: adding new frames to the time-based buffer at a fixed frequency.

Clause 21: The method of any of clauses 17-20, further comprising: determining a time to collision based on the trajectory of the at least one moving object and a trajectory of the sensor; and performing the navigation function based on the predicted trajectory.

Clause 22: The method of any of clauses 17-21, wherein the sensor comprises an image acquiring device and wherein the frames comprises images acquired by the image acquiring device.

Clause 23: The method of any of clauses 17-22, wherein the sensor comprises a point cloud acquiring device and wherein the frames comprise point cloud frames.

Clause 24: The method of clause 23, further comprising: storing a second time-based buffer with a first set of images acquired by an image acquiring device; storing a second distance-based buffer with a second set of images acquired by the image acquiring device; performing the moving object segmentation on the first set of frames, the second set of frames, the first set of images, and the second set of images to identify the at least one moving object in the scene of the point clouds.

Clause 25: The method of clause 24, further comprising: adding a new image acquired by the image acquiring device to the second distance-based buffer in response to the image acquiring device having moved a second threshold unit of distance.

Clause 26: The method of clause 25, further comprising: dynamically determining the second threshold unit of distance based on a speed of the image acquiring device.

Clause 27: The method of any of clauses 24-26, further comprising: adding new image to the second time-based buffer at a fixed frequency.

Clause 28: A computer-readable storage medium storing instructions that when executed by one or more processors cause the one or more processors to: store, in a time-based buffer, a first set of frames acquired by a sensor; store, in a distance-based buffer, a second set of frames acquired by the sensor; perform moving object segmentation on the first set of frames and the second set of frames to identify at least one moving object in a scene of the first set of frames and the second set of frames; predict a trajectory of the at least one moving object; and perform a navigation function based on the predicted trajectory.

Clause 29: The computer-readable storage medium of clause 28, storing instructions that when executed by the one or more processors cause the one or more processors to: monitor a distance moved by the sensor; and add a new frame acquired by the sensor to the distance-based buffer in response to the sensor having moved a threshold unit of distance.

Clause 30: The computer-readable storage medium of clause 28 or 29, storing instructions that when executed by the one or more processors cause the one or more processors to: add new frames to the time-based buffer at a fixed frequency.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for navigation, the apparatus comprising:
   a memory configured to store a time-based buffer with a first set of frames acquired from a sensor and a distance-based buffer with a second set of frames acquired from the sensor;
   one or more processors implemented in circuitry, in communication with the memory, and configured to:
      determine that the sensor has moved a threshold unit of distance;
      add a new frame acquired from the sensor to the second set of frames in response to determining that the sensor has moved the threshold unit of distance;
      perform moving object segmentation on the first set of frames and the second set of frames to identify at least one moving object in a scene of the first set of frames and the second set of frames;
      predict a trajectory of the at least one moving object; and
      perform a navigation function based on the predicted trajectory.

2. The apparatus of claim 1, wherein the one or more processors are further configured to:
   in response to adding the new frame to the distance-based buffer, remove an oldest frame from the distance-based buffer.

3. The apparatus of claim 1, wherein the one or more processors are configured to dynamically determine the threshold unit of distance based on a speed at which the sensor is moving.

4. The apparatus of claim 1, wherein the one or more processors are configured to dynamically determine the threshold unit of distance based a GPS location of the sensor.

5. The apparatus of claim 1, wherein the one or more processors are further configured to:
   add new frames to the time-based buffer at a fixed frequency.

6. The apparatus of claim 1, wherein the one or more processors are further configured to:
   determine a time to collision based on the trajectory of the at least one moving object and a trajectory of the sensor; and
   perform the navigation function based on the time to collision.

7. The apparatus of claim 1, wherein the sensor comprises an image acquiring device, and wherein the first set of frames and the second set of frames comprises images acquired by the image acquiring device.

8. The apparatus of claim 1, wherein the sensor comprises a point cloud acquiring device, and wherein the first set of frames comprises a first set of point clouds and the second set of frames comprises a second set of point clouds.

9. The apparatus of claim 8, wherein the point cloud acquiring device comprises a LiDAR sensor configured to capture point clouds, and wherein the one or more processors are part of an advanced driver assistance system (ADAS).

10. The apparatus of claim 8, wherein, the memory is further configured to store a second time-based buffer with a first set of images acquired from an image acquiring device and a second distance-based buffer with a second set of images acquired from the image acquiring device; and the one or more processors are configured to perform the moving object segmentation on the first set of point clouds, the second set of point clouds, the first set of images, and the second set of images to identify the at least one moving object in the scene of the point clouds.

11. The apparatus of claim 10, wherein the one or more processors are further configured to:

add a new image acquired by the image acquiring device to the second distance-based buffer in response to the image acquiring device having moved a second threshold unit of distance.

12. The apparatus of claim 11, wherein the one or more processors are configured to dynamically determine the second threshold unit of distance based on a speed at which the image acquiring device is moving.

13. The apparatus of claim 10, wherein the one or more processors are further configured to:

add new images to the second time-based buffer at a fixed frequency.

14. The apparatus of claim 10, wherein the image acquiring device comprises a camera.

15. The apparatus of claim 1, wherein the one or more processors are external to an advanced driver assistance system (ADAS).

16. A method for navigation, the method comprising:

storing, in a time-based buffer, a first set of frames acquired by a sensor;

storing, in a distance-based buffer, a second set of frames acquired by the sensor;

determining that the sensor has moved a threshold unit of distance;

adding a new frame acquired from the sensor to the second set of frames in response to determining that the sensor has moved the threshold unit of distance;

performing moving object segmentation on the first set of frames and the second set of frames to identify at least one moving object in a scene of the first set of frames and the second set of frames;

predicting a trajectory of the at least one moving object; and performing a navigation function based on the predicted trajectory.

17. The method of claim 16, further comprising:

in response to adding the new frame to the distance-based buffer, removing an oldest frame from the distance-based buffer.

18. The method of claim 16, further comprising:

adding new frames to the time-based buffer at a fixed frequency.

19. The method of claim 16, further comprising:

determining a time to collision based on the trajectory of the at least one moving object and a trajectory of the sensor; and performing the navigation function based on the time to collision.

20. The method of claim 16, wherein the sensor comprises an image acquiring device and wherein the frames comprises images acquired by the image acquiring device.

21. The method of claim 16, wherein the sensor comprises a point cloud acquiring device, wherein the first set of frames comprises a first set of point clouds and the second set of frames comprises a second set of point clouds.

22. The method of claim 21, further comprising:

storing a second time-based buffer with a first set of images acquired by an image acquiring device;

storing a second distance-based buffer with a second set of images acquired by the image acquiring device; and performing the moving object segmentation on the first set of frames, the second set of frames, the first set of images, and the second set of images to identify the at least one moving object in the scene of the point clouds.

23. The method of claim 22, further comprising:

adding a new image acquired by the image acquiring device to the second distance-based buffer in response to the image acquiring device having moved a second threshold unit of distance.

24. The method of claim 23, further comprising:

dynamically determining the second threshold unit of distance based on a speed of the image acquiring device.

25. The method of claim 22, further comprising:

adding new images to the second time-based buffer at a fixed frequency.

26. A non-transitory computer-readable storage medium storing instructions that when executed by one or more processors cause the one or more processors to:

store, in a time-based buffer, a first set of frames acquired by a sensor;

store, in a distance-based buffer, a second set of frames acquired by the sensor;

determine that the sensor has moved a threshold unit of distance;

add a new frame acquired from the sensor to the second set of frames in response to determining that the sensor has moved the threshold unit of distance;

perform moving object segmentation on the first set of frames and the second set of frames to identify at least one moving object in a scene of the first set of frames and the second set of frames;

predict a trajectory of the at least one moving object; and perform a navigation function based on the predicted trajectory.

27. The non-transitory computer-readable storage medium of claim 26, storing instructions that when executed by the one or more processors cause the one or more processors to:

add new frames to the time-based buffer at a fixed frequency.

28. The apparatus of claim 1, wherein the one or more processors are further configured to:

determine a frame rate based on a state of a vehicle to which the sensor is mounted, wherein the frame rate defines a number of frames per a unit of distance travelled by the sensor; and add new frames, acquired from the sensor, to the distance-based buffer at the frame rate.

29. The method of claim 16, further comprising:

determining a frame rate based on a state of a vehicle to which the sensor is mounted, wherein the frame rate defines a number of frames per a unit of distance travelled by the sensor; and adding new frames, acquired from the sensor, to the distance-based buffer at the frame rate.

30. The non-transitory computer-readable storage medium of claim 26, storing instructions that when executed by the one or more processors cause the one or more processors to:

determine a frame rate based on a state of a vehicle to which the sensor is mounted, wherein the frame rate defines a number of frames per a unit of distance travelled by the sensor; and add new frames, acquired from the sensor, to the distance-based buffer at the frame rate.

\* \* \* \* \*